No. 881,911. PATENTED MAR. 17, 1908.
P. M. EGAN.
VENTILATOR.
APPLICATION FILED NOV. 1, 1906.
3 SHEETS—SHEET 1.
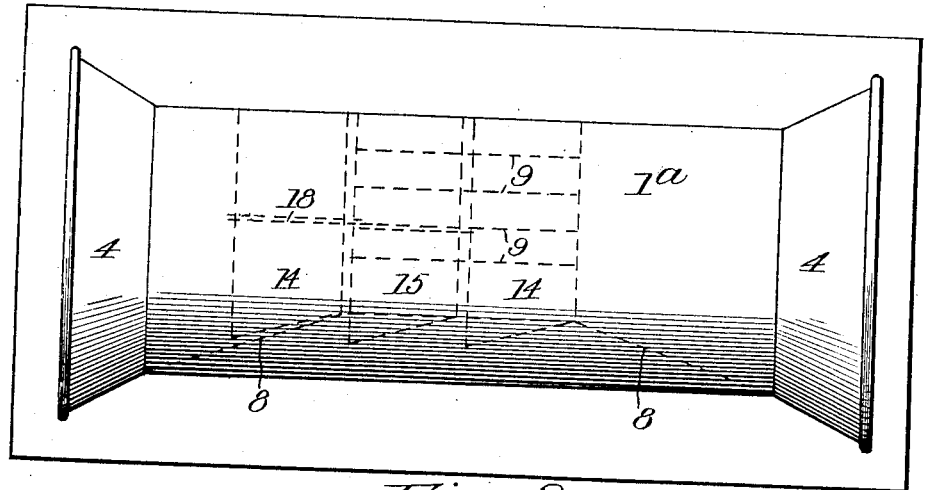
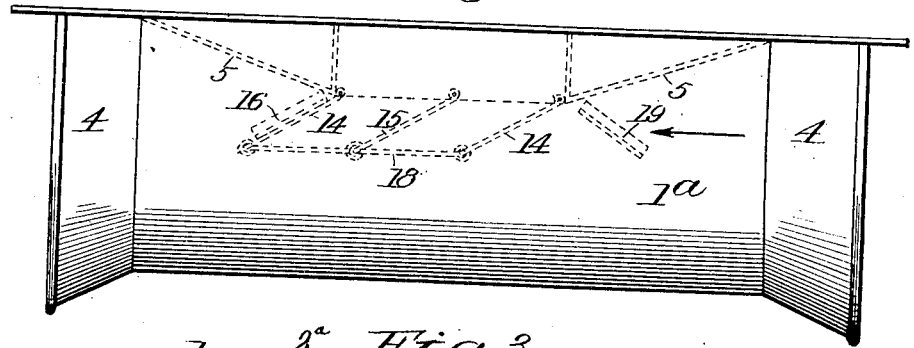
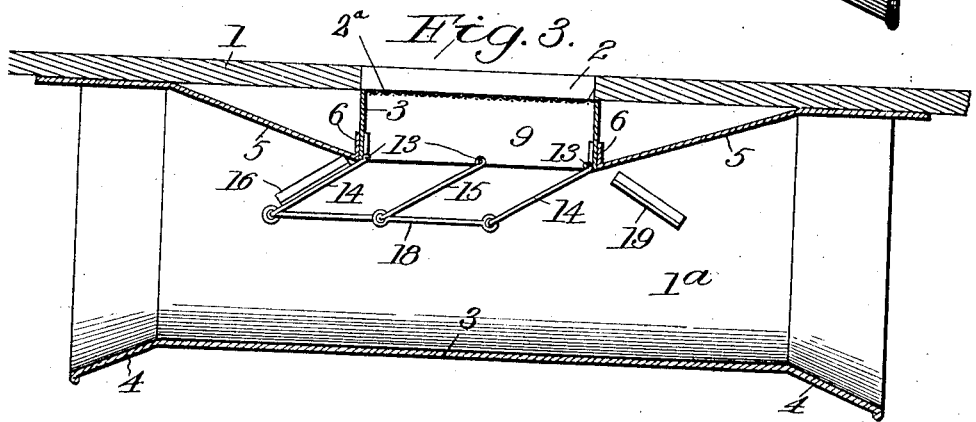
Witnesses
C. H. Walker
M. R. Meacham.
Inventor
Patrick M. Egan.
By
Attorney No. 881,911.  
P. M. EGAN.  
VENTILATOR.  
APPLICATION FILED NOV. 1, 1906.
PATENTED MAR. 17, 1908.
3 SHEETS—SHEET 2.
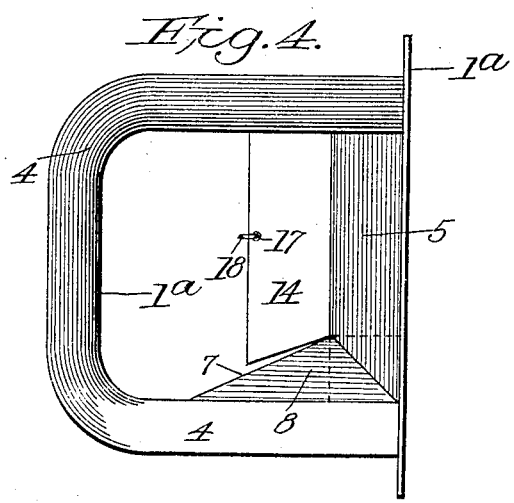
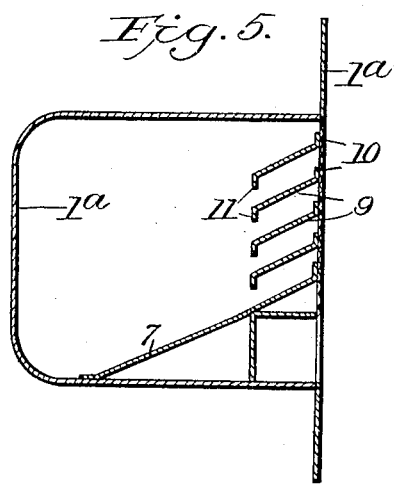
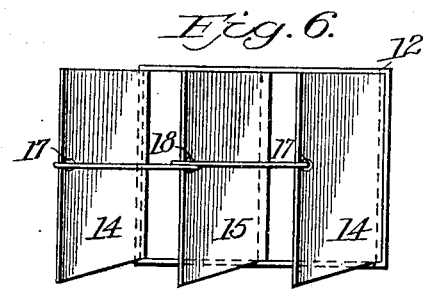
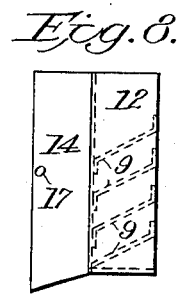
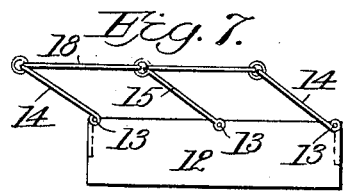
Witnesses  
C. H. Walker.  
M. A. Meacham.
Inventor  
Patrick M. Egan.  
By
Attorney No. 881,911. PATENTED MAR. 17, 1908.
P. M. EGAN.
VENTILATOR.
APPLICATION FILED NOV. 1, 1906.
3 SHEETS—SHEET 3.
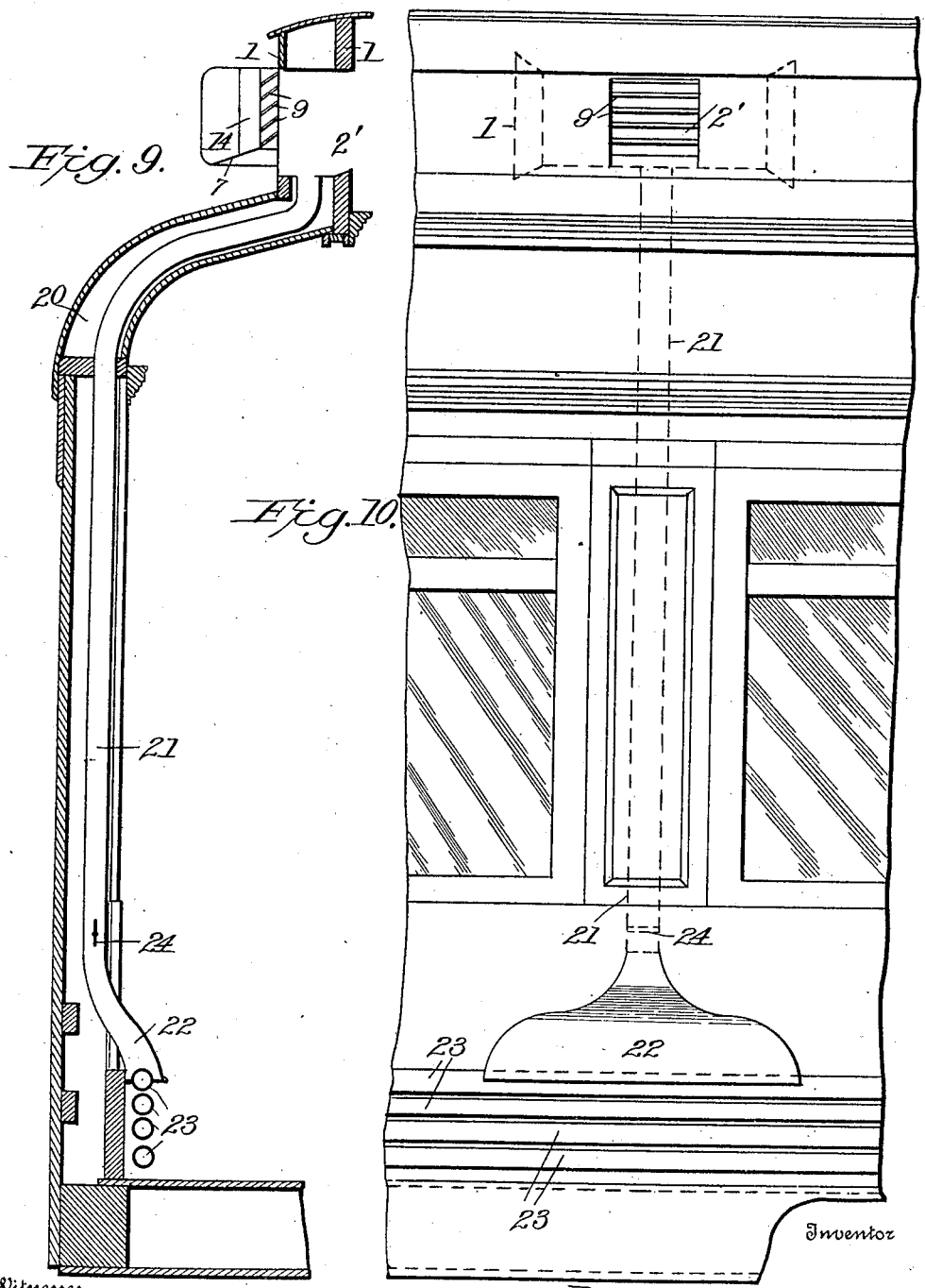

2
UNITED STATES PATENT OFFICE.

PATRICK M. EGAN, OF COUNCIL BLUFFS, IOWA.

VENTILATOR.

No. 881,911.    Specification of Letters Patent.    Patented March 17, 1908.

Application filed November 1, 1906. Serial No. 341,593.

*To all whom it may concern:*

Be it known that I, PATRICK M. EGAN, a citizen of the United States, residing at Council Bluffs, in the county of Pottawattamie and State of Iowa, have invented certain new and useful Improvements in Ventilators, of which the following is a specification.

This invention relates to ventilators.

One object is to provide a ventilator constructed and arranged to provide for a complete ventilation of railroad cars or buildings.

Another object is to provide a ventilator of the character stated embodying such characteristics as to provide for a vacuum in the car as air rushes through the ventilator.

A still further object lies in the provision of a ventilator so constructed and arranged that it may be effective regardless of the direction in which a train may be moving and effectually carrying out the purposes of completely ventilating the interior of the car and preventing the possibility of dirt, cinder and other foreign matter finding its way through the ventilator into the car.

A further object I have in view is to permit the deflectors to automatically position themselves according to the direction of movement of the car or other vehicle and to provide not only for a perfect ventilation but also to prevent dust, cinder or rain entering the vehicle.

With the above and other objects in view, the present invention consists in the combination and arrangement of parts hereinafter more fully described, shown in the accompanying drawings and particularly pointed out in the appended claims, it being understood that changes may be made in the proportions, material, size and minor details without departing from the spirit of the invention or sacrificing any of the advantages thereof.

In the drawings:—Figure 1 is an elevation of a portion of a car illustrating my device in elevation attached thereto. Fig. 2 is a top plan view, certain of the interior parts being shown in dotted lines. Fig. 3 is a longitudinal, horizontal, sectional view of the invention. Fig. 4 is an end view. Fig. 5 is a transverse, sectional view. Fig. 6 is a detailed plan view illustrating the deflectors. Fig. 7 is a detailed side view of the deflectors and the frame in which they are mounted. Fig. 8 is a detail elevation of the deflector blades viewing the same at an angle from Fig. 7. Fig. 9 is an elevation of a portion of a car illustrating my invention partly in full and dotted lines in a stateroom or berth of a Pullman car, and Fig. 10 is a sectional view illustrating the modified form shown in elevation in Fig. 9.

Referring now to the accompanying drawings and more particularly to Figs. 1 to 8 inclusive, the reference character 1 indicates the upper portion of a car or a portion of any other suitable structure provided with an opening 2 preferably surrounded by a rectangular or other shaped frame 3 to which the casing 1$^a$ is secured instead of directly to the car or other structure. This peculiar mounting of the casing prevents marring of the structure to which it is secured. If desired, a screen 2$^a$ may be disposed over the opening 2, as indicated in Fig. 2.

The top, bottom and outer side faces of the casing 1$^a$ are flared outwardly at each end, as at 4, while the inner face of said casing preferably extends at each end slightly beyond the outer extremity of said flaring portions 4. The inner face of the casing at each end is directed inwardly toward the opposite end and toward the outer side of the casing, as at 5. The inner extremity of these inclined portions 5 are bent, turned or otherwise shaped to form flanges 6 for engagement with the corresponding sides of the aforesaid frame 3 to be secured thereto for the support of the casing 1$^a$.

Reference to Fig. 5 will disclose that the top of the casing 1$^a$ extends along the upper outer face of the frame 3 to be secured thereto, while the bottom of the casing is provided with a gutter whose inner wall 7 engages the outer face of the bottom of the said frame to be secured thereto. As clearly shown in this same figure of the drawings, the wall 7 extends from the outer edge of the frame to the bottom of the casing 1$^a$ near the outer face of the latter. The opposite ends 8 of this wall 7 are inclined downwardly into meeting engagement with the bottom of the casing 1$^a$ at the base of the flaring portions 4 of the latter. As the result of the inclined parts 5 of the bottom of the casing and the inclined parts 8 of the wall 7, the interior of the casing is of less diameter at its center than at its ends for a purpose presently understood.

Arranged within the frame 3 is a series of fixed slats 9, each arranged upon a downward incline with its inner longitudinal edge 10 lying in a plane opposite to the plane of the outer longitudinal edge 11 thereof. These slats are fixed and need not necessarily be as wide as the depth of the frame 3.

A strip of suitable material 12 may be secured to opposite, upper, inner sides of the frame 3, to each of which is engaged the pintle 13 of the end deflectors 14, there being an intermediate swinging deflector 15 arranged to coöperate with the end swinging deflector 14 across the frame intermediate the ends of the latter. The lower ends of the deflectors are inclined, as shown, to correspond to the inclination of the aforesaid wall 7 (see Figs. 4 and 6).

In Fig. 2, the arrow indicates the direction in which the train is moving. Under these conditions, the deflectors are swung by the wind upon their pivots to a point controlled by the stop 16, and in order that all deflectors may be thrown simultaneously to assume the same planes, I provide each deflector with a perforation 17 engaged by the link connections 18. If the train should be moving in the opposite direction the deflectors would be swung automatically into directly opposite planes and limited in the latter swinging movement by the stop 19.

From the foregoing it will be seen that the wind passing through the contracted intermediate portion of the casing will operate the deflectors automatically and create a vacuum in the car to cause the hot or impure air therein to be drawn outwardly therefrom between the slats 9 of the frame 3. The slats 9 are arranged at an angle to the plane of the deflectors, in view of which, a cinder, dirt, or rain in order to enter the car would have to travel against the laws of gravitation. Aside from the contraction at the center of the casing incident to the inclined parts 5 and the wall 7 with its inclined portions 8, the deflectors still further decrease the area intermediate the ends of the casing. The result is that the air passing through the ventilator and over the lattice work resulting from the slats 9, together with the deflectors projecting from the frame, a strong vacuum is provided for.

In Figs. 9 and 10, I illustrate my improved ventilator in coöperation with a state or drawing room, in which it will be seen that the opening 2' communicates with the air space 20 of the car and that in this space 20 there is disposed a pipe 21 connected at its lower end to a flaring intake member 22 whose lower end opens over the radiating tubes 23 within the car. In this pipe 21 I provide a damper 24 for obvious purposes. Aside from the feature just referred to there is no change whatever in the construction of the ventilator hereinbefore described. It might be remarked that the air pipe 21 has its intake starting immediately over the heating pipes and passing between the inner and outer walls of the case up to the bottom of the ventilator in the clearing deck thus causing a vacuum in the conductor pipe 21 between the heater and ventilator acting entirely under natural laws. This particular system is designed for taking up the excess heat caused by over heating systems and especially will this system be of advantage in the early spring and fall.

What is claimed is:—

1. In a ventilator, a car having an opening therein, a frame surrounding the opening, and a casing secured to said frame, the back of the casing intermediate its ends diverging from the car.

2. In a ventilator, a car having an opening therein, a frame surrounding the opening, a casing secured to the frame and communicating with said opening, the back wall of the casing intermediate its ends diverging from the car toward the outer edge of said frame, slats in the frame, deflector blades mounted upon said frame to swing automatically, and stops to limit the movement of the blades.

3. In a ventilator, a car having an opening therein, a frame surrounding the opening, slats arranged within the frame, each slat having its edges turning in opposite directions, deflectors mounted to swing adjacent the frame and coöperate with said slats, and a casing secured to the frame.

4. In a ventilator, a car having an opening therein, a screen over the opening, a frame surrounding the opening, slats arranged within the frame, each slat having its edges turned in opposite directions, deflectors mounted to swing adjacent the frame and coöperate with said slats, and a casing secured to the frame.

5. In a ventilator, a car having an opening therein, and a casing fitted over the opening and communicating with the car by way of said opening, the back wall of the casing diverging from the car, and the bottom wall of the casing being inclined intermediate its ends to coöperate with the diverging portions of the back wall of the casing.

6. In a ventilator, a car having an opening therein, a frame surrounding the opening, slats arranged within the frame, each slat having its ends turned in opposite directions, and deflectors mounted to swing adjacent the frame and coöperate with the slats.

7. In a ventilator, a car having an opening therein, a screen fitted over said opening, a casing fitted over the opening and communicating with the car by way of said opening, the back wall of the casing intermediate its ends diverging from the rear, and the bottom wall of the casing intermediate its ends being inclined to coöperate with the diverging portion of the back wall of the casing, and deflector blades arranged adjacent the opening to swing automatically, one end of each blade being inclined to correspond with the inclination of the bottom wall of the casing.

8. In a ventilator, a car having an opening therein, a casing fitted over the opening and communicating with the car by way of said opening, the back wall of the casing intermediate its ends diverging from the car, and the bottom wall of the casing intermediate its ends being inclined to coöperate with the diverging portions of the back wall of the casing, and deflector blades arranged adjacent the opening to swing automatically, one end of each blade being inclined to correspond with the inclination of the bottom wall of the casing.

9. In a ventilator, a car having an opening therein, a casing fitted over the opening, and communicating with the car by way of the opening, the back wall of the casing intermediate its ends having portions upon opposite sides of the opening diverging from the car toward said opening and the bottom wall of the casing intermediate its ends being inclined to coöperate with the diverging portions of the back wall of the casing, deflector blades connected together and mounted adjacent the opening to swing automatically according to the direction of travel of the car, one end of each blade being inclined to correspond with the inclination of the inclined portion of the bottom wall of the casing, and stops to limit the swinging movement of the blades.

10. In a ventilator, a car having an opening therein, a frame surrounding the opening, slats arranged upon an incline within the frame and being of a width equal to the depth of the frame, and deflectors mounted adjacent the frame to swing automatically.

11. In a ventilator, a car having an opening therein, a frame surrounding the opening, and a ventilator casing secured to said frame, the casing being contracted intermediate its ends, slats arranged within the frame, and deflector blades mounted upon the frame to swing automatically according to the direction of travel of the car, said blades being arranged at a direct right angle to the plane of said slats.

12. In a ventilator, a structure having an opening therein, a ventilator casing for communication with said opening, a conductor pipe communicating with the said casing and having an outwardly flaring intake at its lower end, and a damper in the line of said conductor pipe.

13. In a ventilator, a car having an opening therein, a ventilator casing having communication with said opening and contracted intermediate its ends, deflectors arranged within the casing to swing automatically according to the direction of the wind, a conductor pipe communicating with the said casing and provided at its lower end with an outwardly flaring intake, and a damper arranged in a line with the conductor pipe.

14. In a ventilator, a car having an opening therein, a frame surrounding the opening, a ventilator casing mounted upon said frame and communicating with the car through said opening, deflector blades mounted upon the frame adjacent said opening to swing automatically, a conductor pipe communicating with said casing and having an outwardly flaring intake at its lower end, and a damper in the line of said conductor pipe.

15. In a ventilator, a car having an opening therein, a ventilator casing having its rear and bottom walls constructed to form a contraction intermediate the ends of the casing, and deflector blades arranged adjacent the opening to swing automatically according to the direction of travel of the car, and a stop arranged within the casing upon each side of said opening to limit the movement of the deflector blades.

16. In a ventilator, a car having an opening therein, a frame surrounding the opening, inclined slats arranged within the frame, the opposite longitudinal edges of the slats being turned in opposite directions, a casing secured to the frame and having its back and bottom walls formed to provide a contraction intermediate the ends of the casing opposite the opening and frame, and deflector blades mounted upon the frame to swing automatically according to the direction of travel of the car, the blades being constructed to conform to the shape of the contraction of the casing.

17. In a ventilator, a car having an opening therein, a screen fitted over said opening, a frame surrounding the opening, a casing secured to the frame and communicating with said opening, the back wall of the casing intermediate its ends diverging from the rear toward the outer edge of said frame, slats in the frame, deflectors mounted upon said frame to swing automatically according to the direction of travel of the car, and stops to limit the movement of the deflectors.

In testimony whereof I have signed my name to this specification in the presence of two subscribing witnesses.

PATRICK M. EGAN.

Witnesses:
JOHN M. GALVIN,
THOMAS GALVIN.